US011029620B2

(12) United States Patent
Tsuda (10) Patent No.: US 11,029,620 B2
(45) Date of Patent: Jun. 8, 2021

(54) ROTARY-BODY SUPPORT STRUCTURE

(71) Applicant: FUJI XEROX CO., LTD., Tokyo (JP)

(72) Inventor: Yu Tsuda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/816,635

(22) Filed: Mar. 12, 2020

(65) Prior Publication Data
US 2021/0088927 A1    Mar. 25, 2021

(30) Foreign Application Priority Data

Sep. 24, 2019  (JP) .............................. JP2019-172416

(51) Int. Cl.
| | |
|---|---|
| *G03G 21/00* | (2006.01) |
| *F16C 17/00* | (2006.01) |
| *A47L 11/00* | (2006.01) |
| *G03G 15/02* | (2006.01) |
| *F16C 17/12* | (2006.01) |
| *A47L 11/282* | (2006.01) |
| *A47L 5/30* | (2006.01) |
| *A47L 11/40* | (2006.01) |

(52) U.S. Cl.
CPC ............ *G03G 15/0225* (2013.01); *A47L 5/30* (2013.01); *A47L 11/282* (2013.01); *A47L 11/4069* (2013.01); *F16C 17/12* (2013.01); *G03G 15/0258* (2013.01); *G03G 21/0035* (2013.01); *G03G 21/0058* (2013.01); *F16C 2324/16* (2013.01)

(58) Field of Classification Search
CPC ........... G03G 15/0225; G03G 15/0258; G03G 15/2025; G03G 21/0035; G03G 21/0058; F16C 17/04; F16C 17/10; F16C 17/12; F16C 2324/16; A47L 5/30; A47L 11/24; A47L 11/282; A47L 11/32; A47L 11/4041; A47L 11/4069
USPC .............. 399/100, 175, 176, 353, 355, 357; 384/416, 418; 15/43, 52.1, 308, 366, 15/383, 385, 392
See application file for complete search history.

(56) References Cited

U.S. PATENT DOCUMENTS

| | | | | |
|---|---|---|---|---|
| 3,325,849 | A * | 6/1967 | Waters | ....................... A47L 5/30 15/392 |
| 4,914,777 | A * | 4/1990 | Cartellone | ............... A46B 7/10 15/182 |
| 4,976,003 | A * | 12/1990 | Williams | ............... A47L 9/0411 15/322 |
| 9,335,705 | B1 * | 5/2016 | Fukuzawa | .......... G03G 21/1821 |
| 2007/0098435 | A1 * | 5/2007 | Kitagawa | ........... G03G 15/0225 399/100 |
| 2012/0107012 | A1 * | 5/2012 | Amemiya | .......... G03G 15/0225 399/100 |
| 2020/0142346 | A1 * | 5/2020 | Ueno | .................. G03G 21/0058 |

* cited by examiner

FOREIGN PATENT DOCUMENTS

| | | | |
|---|---|---|---|
| JP | 2009-042535 | A | 2/2009 |
| JP | 2009271109 | A * | 11/2009 |

*Primary Examiner* — Robert B Beatty
(74) *Attorney, Agent, or Firm* — Sughrue Mion, PLLC (57) ABSTRACT

A rotary-body support structure includes: a rotary body including a rotary shaft and a contact portion spirally wound around the rotary shaft; and bearing parts that rotatably support the rotary body. The amount of engagement of the rotary body with a contact body that is in contact with the contact portion of the rotary body changes when the rotary body moves toward one side in a rotation axis direction.

20 Claims, 13 Drawing Sheets

ROTARY-BODY SUPPORT STRUCTURE

CROSS-REFERENCE TO RELATED APPLICATIONS

This application is based on and claims priority under 35 USC 119 from Japanese Patent Application No. 2019-172416 filed Sep. 24, 2019.

BACKGROUND (i) Technical Field

The present disclosure relates to a rotary-body support structure.

(ii) Related Art

Japanese Unexamined Patent Application Publication No. 2009-042535 discloses an image forming apparatus including: an image carrier that carries an image on the surface thereof; a charging device that includes a charging roller, which is in contact with the image carrier and charges the surface of the image carrier while rotating in a predetermined positive rotation direction, the charging roller sometimes rotating in a reverse direction opposite to the positive rotation direction, a cleaning roller, which in contact with and rotated by the charging roller, thus removing adherents on the charging roller surface, and a holding part that rotatably holds the cleaning roller, the holding part holding the cleaning roller in a first orientation in which a predetermined contact pressure is produced between the charging roller and the cleaning roller when the charging roller is rotated in the positive rotation direction and in a second orientation in which a contact pressure lower than the predetermined contact pressure is produced between the charging roller and the cleaning roller when the charging roller is rotated in the reverse direction; a rotation controller that controls the rotation direction (i.e., positive or reverse) of the charging roller; and an image forming part that forms an electrostatic latent image on the image carrier charged by the charging device and develops the electrostatic latent image into a developer image.

SUMMARY

Aspects of non-limiting embodiments of the present disclosure relate to providing a rotary-body support structure in which the amount of engagement of a rotary body with a contact member with which the rotary body is in contact is reduced when rotation of the rotary body is stopped.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a rotary-body support structure including: a rotary body including a rotary shaft and a contact portion spirally wound around the rotary shaft; and bearing parts that rotatably support the rotary body. The amount of engagement of the rotary body with a contact body that is in contact with the contact portion of the rotary body changes when the rotary body moves toward one side in a rotation axis direction.

BRIEF DESCRIPTION OF THE DRAWINGS

Exemplary embodiments of the present disclosure will be described in detail based on the following figures, wherein.

DETAILED DESCRIPTION

The present disclosure will be described in more detail below by means of an exemplary embodiment and examples with reference to the drawings. However, the present disclosure is not limited to these exemplary embodiment and examples.

It should be noted that, in the following description given with reference to the drawings, the drawings are schematic, and the dimensional ratios and the like are different from the actual ones. For ease of understanding, components other than those necessary for explanation will be omitted from the illustration as appropriate.

For ease of understanding, in the drawings, the front-rear direction, the left-right direction, and the top-bottom direction will be referred to as the X-axis direction, the Y-axis direction, and the Z-axis direction, respectively.

(1) Overall Configuration and Operation of Rotary-Body Support Structure

Figure 1:
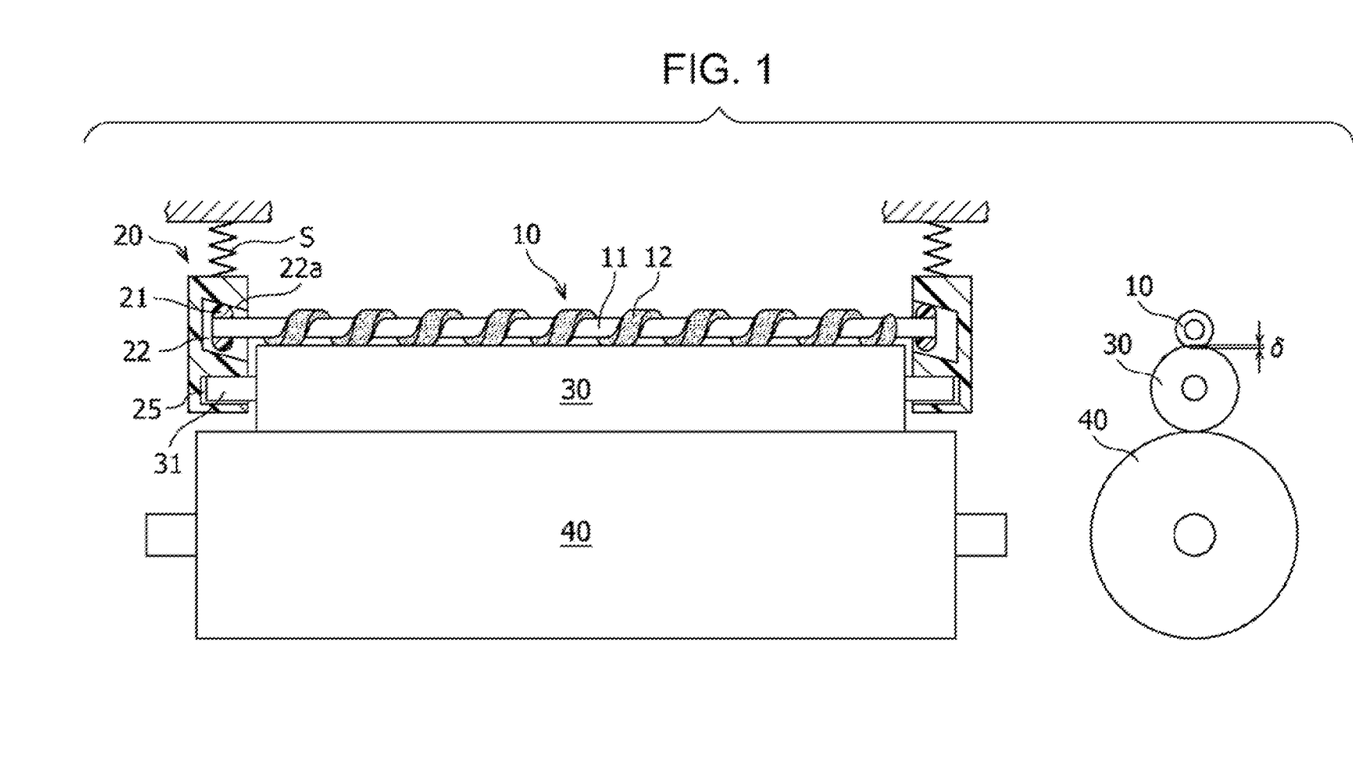
FIG. 1 is a schematic sectional view of a rotary-body support structure according to this exemplary embodiment.
Figure 2:
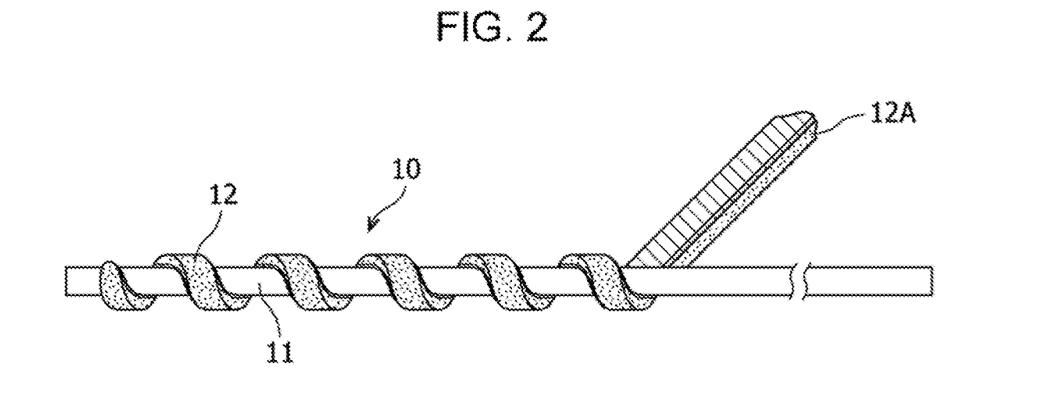
FIG. 2 illustrates a rotary body.
Figure 3:
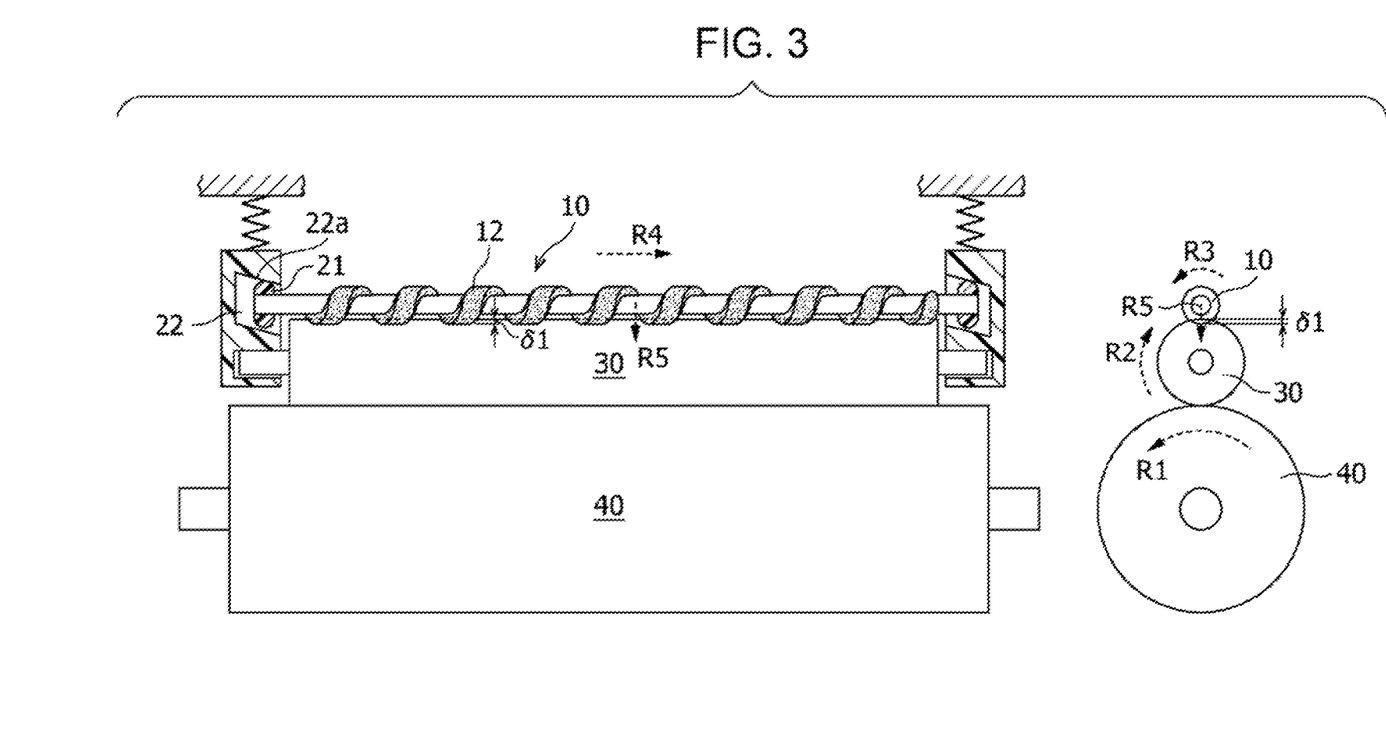
FIG. 3 is a schematic sectional view showing the operation of the rotary-body support structure.

FIG. 1 is a schematic sectional view of a rotary-body support structure 1 according to this exemplary embodiment, FIG. 2 illustrates a rotary body 10, and FIG. 3 is a schematic sectional view showing the operation of the rotary-body support structure 1.

Referring to the drawings, the overall configuration of the rotary-body support structure 1 will be described.

(1.1) Overall Configuration of Rotary-Body Support Structure

As shown in FIG. 1, the rotary-body support structure 1 includes the rotary body 10 and holder members 20, serving as an example of bearing parts, that rotatably support the rotary body 10.

The rotary body 10 includes a core 11, serving as an example of a rotary shaft, and a strip-like contact portion 12 spirally wound around and fixed to the outer surface of the core 11.

The core 11 is a cylindrical shaft and may be made of metal, such as stainless steel (SUS) or free-cutting steel (SUM). Beside metal, the core 11 may be made of a material having a certain rigidity, such as a synthetic resin. The core 11 may have either a roller shape or a hollow pipe shape.

As shown in FIG. 2, for example, the contact portion 12 is formed of a strip member 12A, which is made of an elastic-foam sponge layer, wound around and fixed to the outer surface of the core 11, to which adhesive is applied in spaced spiral so as to extend in the axial direction of the core 11.

The holder members 20 include contact members 21 fitted on the core 11 of the rotary body 10 and bearing portions 22 that are in contact with and support the contact members 21.

As shown in FIG. 1, the contact members 21 are ring-shaped members having a larger diameter than the core 11 and having a circular outer circumference. Because the contact members 21 are press-fitted on the core 11 and roll while being in contact with the bearing portions 22, the contact members 21 are preferably made of a synthetic resin, such as polyacetal (POM), having high wear resistance and high sliding performance.

As shown in FIG. 1, the bearing portions 22 are recessed so as to receive the contact members 21 and have inclined portions 22a that come into contact with and support the contact members 21.

In this exemplary embodiment, although the holder members 20 have second bearing portions 25 for supporting a rotary shaft 31 of a contact body 30 that comes into contact with the contact portion 12 of the rotary body 10, the second bearing portions 25 do not need to be provided in the holder members 20, but may be provided separately.

In the thus-configured rotary-body support structure 1, the contact body 30 is rotatably supported by the second bearing portions 25 of the holder members 20, and the rotary body 10 is rotatably supported by the bearing portions 22 via the contact members 21. As shown in FIG. 1, the rotary body 10 and the contact body 30 rotatably supported by the holder members 20 are configured such that the holder members 20 are urged by urging members (springs) S while the contact portion 12 is in contact with the contact body 30 with a predetermined amount of engagement 80, and the contact body 30 is in contact with a contact member 40.

(1.2) Operation of Rotary-Body Support Structure

In the rotary-body support structure 1, when the contact member 40 is rotationally driven in the direction of arrow R1 in FIG. 3, the contact body 30 in contact with the contact member 40 is rotated in a driven manner in the direction of arrow R2 in FIG. 3, and the rotary body 10 in contact with the contact body 30 at the contact portion 12 with a predetermined amount of engagement 80 is rotated in a driven manner in the direction of arrow R3 in FIG. 3.

Because the contact portion 12 is spirally wound around the rotary body 10 with certain spaces between the turns, thrust is generated in the axial direction of the core 11 as the rotary body 10 rotates. Thus, the rotary body 10 moves by the thrust in the direction of arrow R4 in FIG. 3, relative to the contact body 30.

When the rotary body 10 moves by the thrust, the contact members 21, which are press-fitted on the core 11 of the rotary body 10, also move in the axial direction within the bearing portions 22. Because the contact members 21 have a ring shape with a circular outer circumference and thus make a point contact with the inclined portions 22a inside the bearing portions 22, the sliding resistance thereof is low. Hence, when the contact members 21 move in the axial direction, the rotary body 10 moves in a direction intersecting (perpendicular to) the axial direction, i.e., the direction of arrow R5 in FIG. 3, in accordance with the inclination of the inclined portions 22a.

As a result, the amount of engagement of the contact portion 12 of the rotary body 10 with the contact body 30 becomes larger (see 81 in FIG. 3) than the amount of engagement δ0 before rotation. While the contact member 40 is rotationally driven, the rotary body 10 is rotated via the contact body 30, and the increased amount of engagement δ1 between the contact portion 12 and the contact body 30 is maintained. Because the inclined portions 22a of the bearing portions 22 are in contact with the contact members 21 fitted on the core 11 and support the rotary body 10, the thrust movement of the rotary body 10 in the axial direction is converted into movement in the direction intersecting the axial direction.

When the rotation of the contact member 40 is stopped, the rotation of the rotary body 10 also stops, and the thrust acting on the rotary body 10 is eliminated. When the thrust acting on the rotary body 10 is eliminated, the rotary body 10 moves in the axial direction along the inclined portions 22a of the bearing portions 22 due to the resilience of the contact portion 12 in contact with the contact body 30, and the amount of engagement is reduced. Thus, the amount of engagement of the rotary body 10 with the contact body 30 is reduced when the rotation of the rotary body 10 is stopped.

Modification 1

Figure 4:
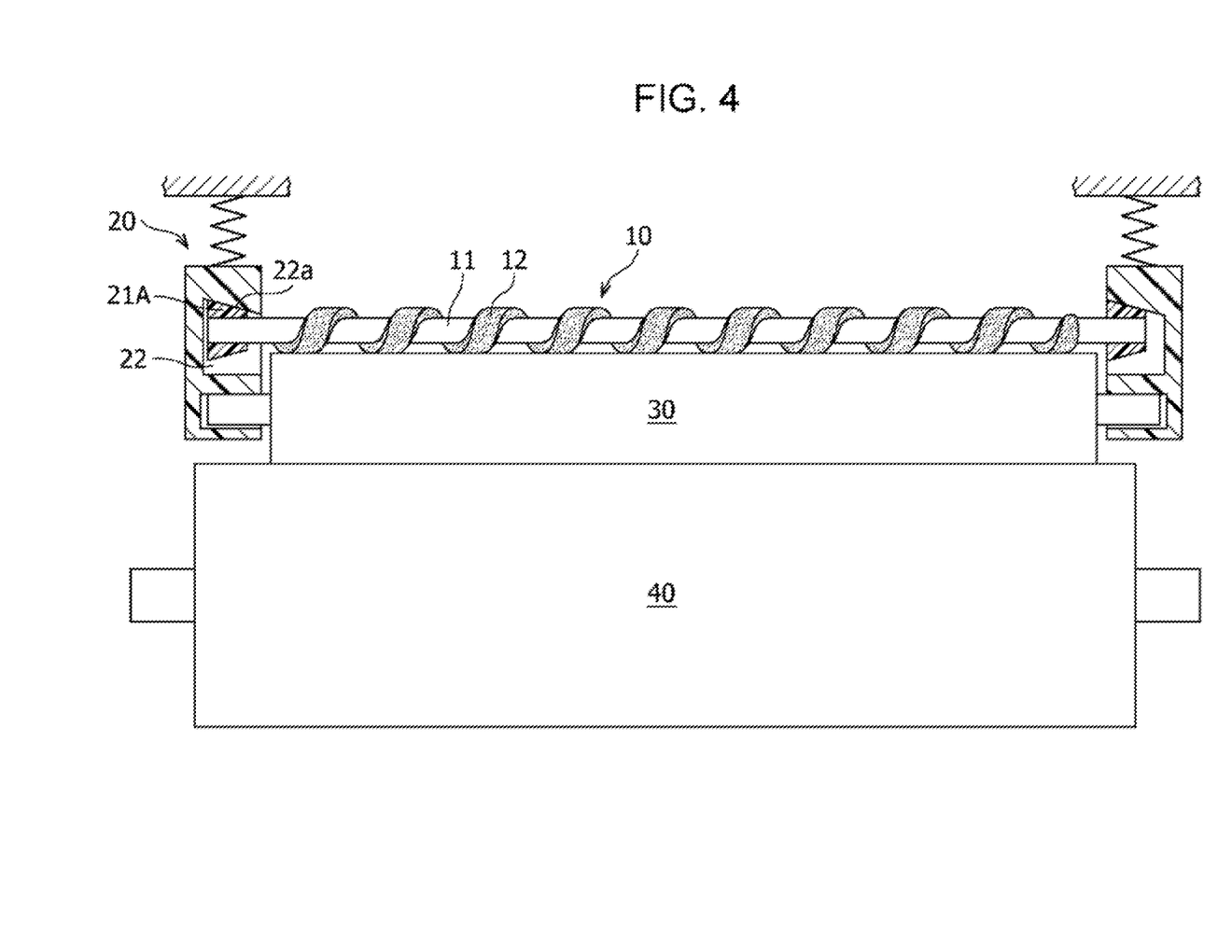
FIG. 4 is a schematic sectional view of a rotary-body support structure according to Modification 1.

FIG. 4 is a schematic sectional view of the rotary-body support structure 1 according to Modification 1.

As shown in FIG. 4, in the rotary-body support structure 1 according to Modification 1, contact members 21A fitted on the core 11 of the rotary body 10 have a tapered shape with an outer circumference tapered in the axial direction of the core 11.

As shown in FIG. 3, the contact members 21A are press-fitted on the ends of the core 11 of the rotary body 10 so as to be oriented in the same direction and are supported so as to be in contact with the inclined portions 22a of the bearing portions 22 over the entire outer circumferences thereof.

With this configuration, when the rotary body 10 is rotated, generating axial thrust, the contact members 21A come into contact with the inclined portions 22a over the entire outer circumferences thereof and move in a direction intersecting (perpendicular to) the axial direction in accordance with the inclination. Thus, the amount of engagement of the rotary body 10 with the contact body 30 is accurately maintained.

Modification 2

Figure 5:
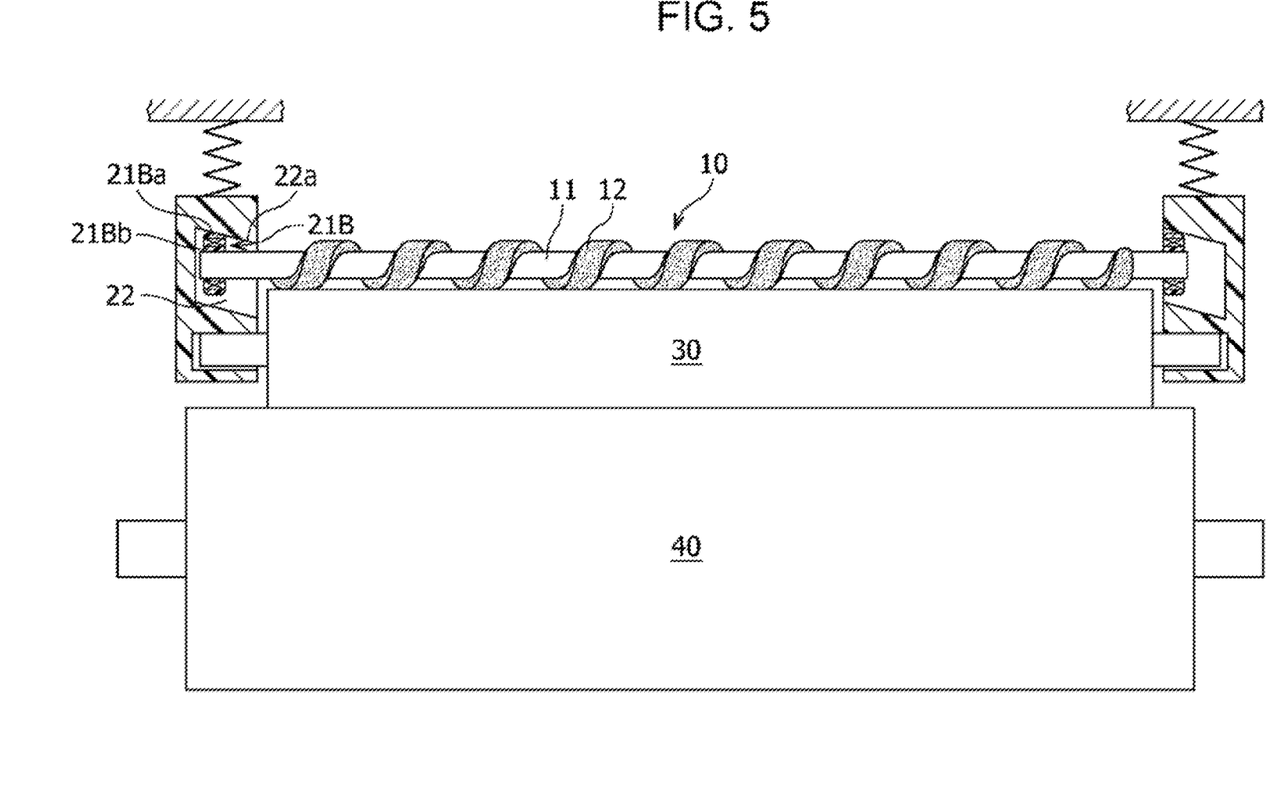
FIG. 5 is a schematic sectional view of a rotary-body support structure according to Modification 2.

FIG. 5 is a schematic sectional view of the rotary-body support structure 1 according to Modification 2.

As shown in FIG. 5, in the rotary-body support structure 1 according to Modification 2, ball bearings 21B, which include outer races 21Ba in contact with the inclined portions 22a and inner races 21Bb fitted on the core 11, are fitted on the core 11 of the rotary body 10.

In the rotary-body support structure 1 according to Modification 2, because the core 11 is rotatably supported by the ball bearings 21B, the outer races 21Aa in contact with the inclined portions 22a of the bearing portions 22 do not roll. Thus, it is possible to suppresses wear of the inclined portions 22a of the bearing portions 22 and to enable smooth rotation of the rotary body 10.

Modification 3

Figure 6:
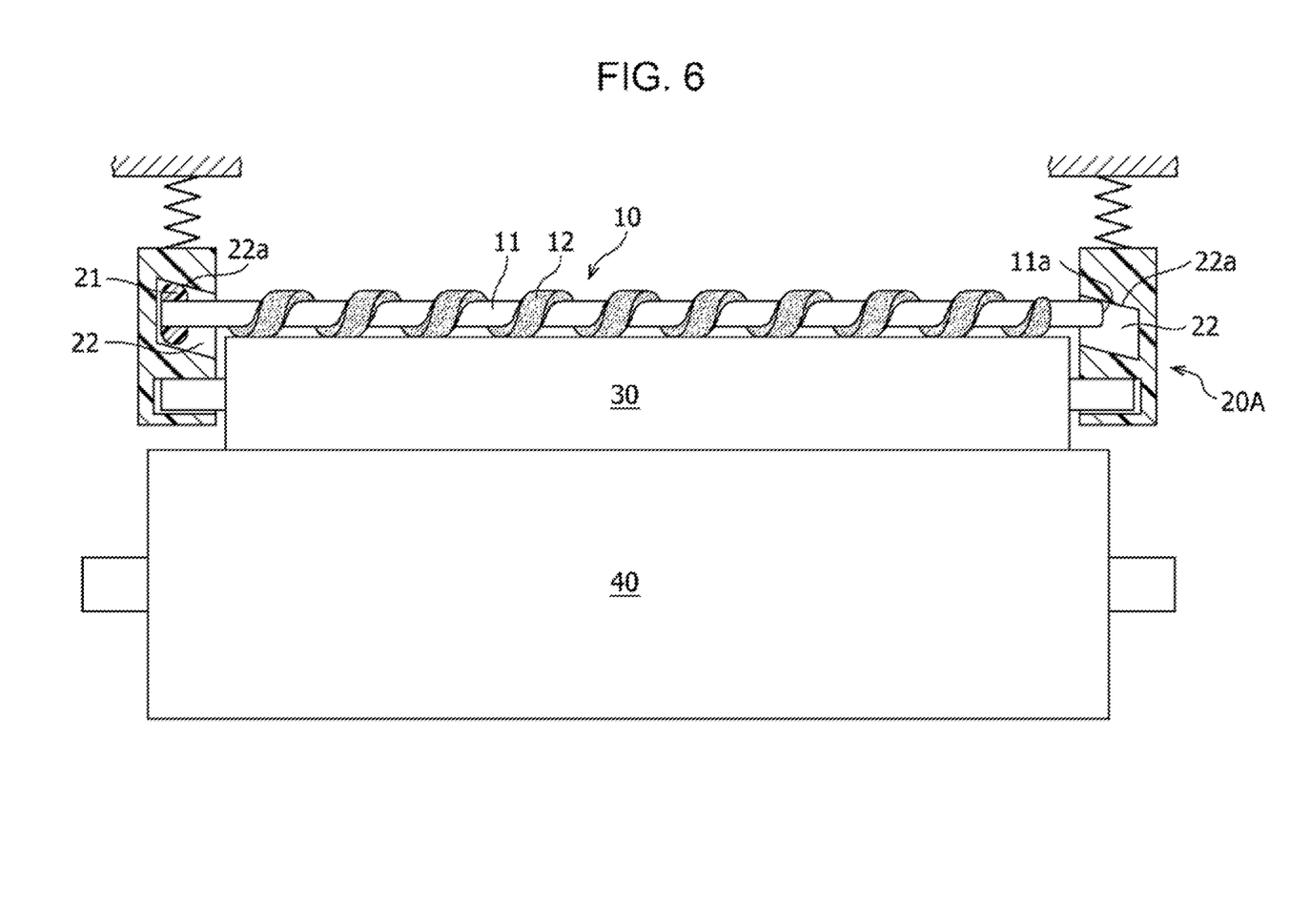
FIG. 6 is a schematic sectional view of a rotary-body support structure according to Modification 3.

FIG. 6 is a schematic sectional view of the rotary-body support structure 1 according to Modification 3.

As shown in FIG. 6, in the rotary-body support structure 1 according to Modification 3, the contact member 21 is fitted on one end of the core 11. The other end, 11a, of the core 11 of the rotary body 10 is directly supported by the inclined portion 22a of the bearing portion 22. Hence, the end 11a is preferably rounded or chamfered to reduce the sliding resistance with the inclined portion 22a.

The bearing portion 22 that directly receives the end 11a of the core 11 without the contact member 21 is preferably made of a conducting material. More specifically, the entire holder members 20A are preferably made of a conducting and slidable synthetic resin, such as POM.

In FIG. 6, although the contact member 21 fitted on one end of the core 11 has a ring shape with a circular outer circumference, the contact member may be either a tapered one with an outer circumference inclined in the axial direction of the core 11, as described in Modification 1, or a ball bearing as described in Modification 2. This configuration, in which the contact member 21 is fitted on one end of the core 11, and the other end of the core 11 is directly supported by the bearing portion 22, simplifies the holder members 20, serving as an example of the bearing parts.

Figure 7:
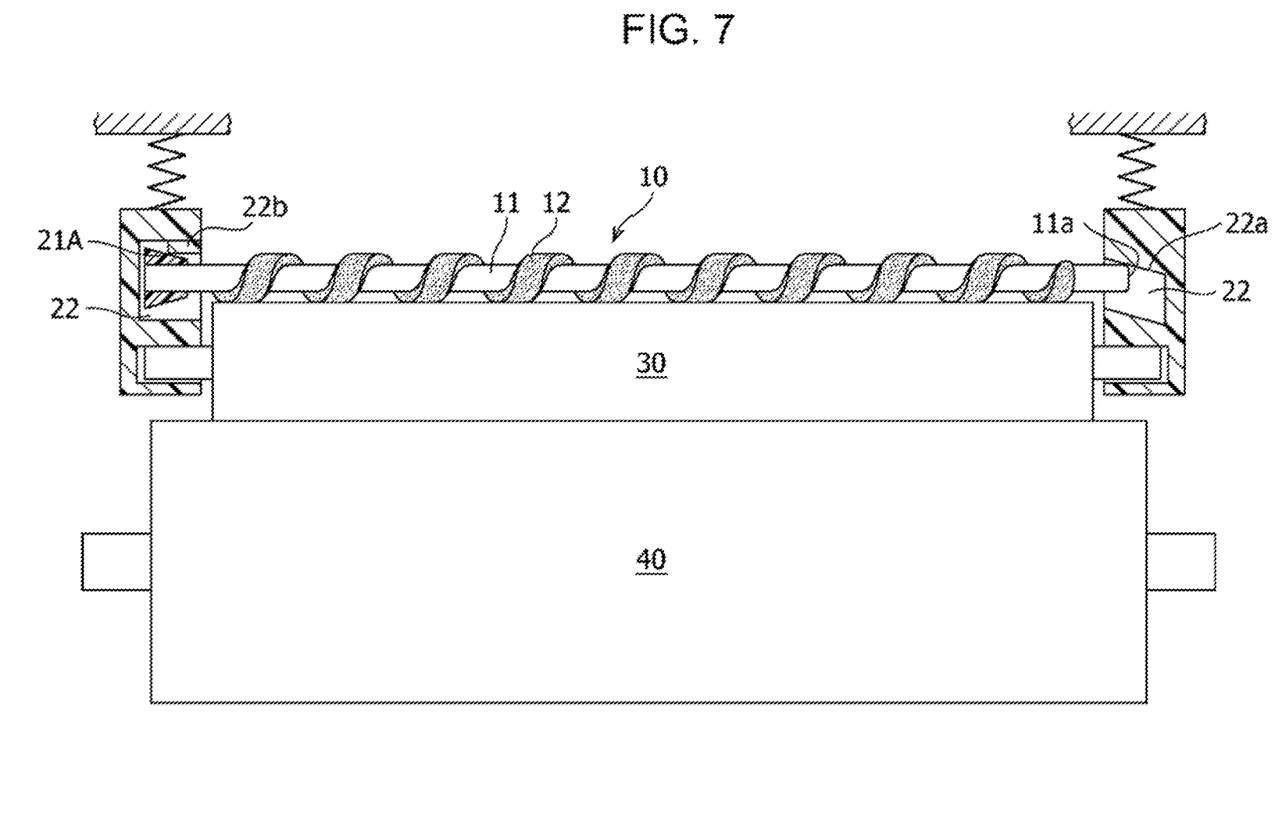
FIG. 7 is a schematic sectional view showing another exemplary aspect of the rotary-body support structure according to Modification 3.

FIG. 7 shows another exemplary aspect of the rotary-body support structure 1 according to Modification 3. As shown in FIG. 6, the inclined portion 22a of the bearing portion 22 is provided on one side corresponding to one end of the core 11 and is in contact with the core 11, and a contact member 21A having a tapered shape with an outer circumference tapered in the axial direction is fitted on the other end of the core 11. As shown in FIG. 7, the bearing portion 22 that rotationally supports the contact member 21A does not have an inclined portion but has, in a portion thereof, a step portion 22b.

When the rotary body 10 in contact with the contact body 30 rotates, thrust is generated in the axial direction of the core 11, moving the rotary body 10 relative to the contact body 30. As a result, the end 11a of the core 11 comes into direct contact with the inclined portion 22a of the bearing portion 22 and moves in the direction intersecting (perpendicular to) the axial direction in accordance with the inclination of the inclined portion 22a, and the contact member 21A on the other end of the core 11 comes into contact with the step portion 22b formed at the bearing portion 22, moving the other end of the core 11 in the direction intersecting (perpendicular to) the axial direction. This way, by changing the thrust movement of the rotary body 10 in the axial direction into movement in the direction intersecting the axial direction, the amount of engagement of the contact portion 12 can be increased.

EXAMPLES

Figure 8:
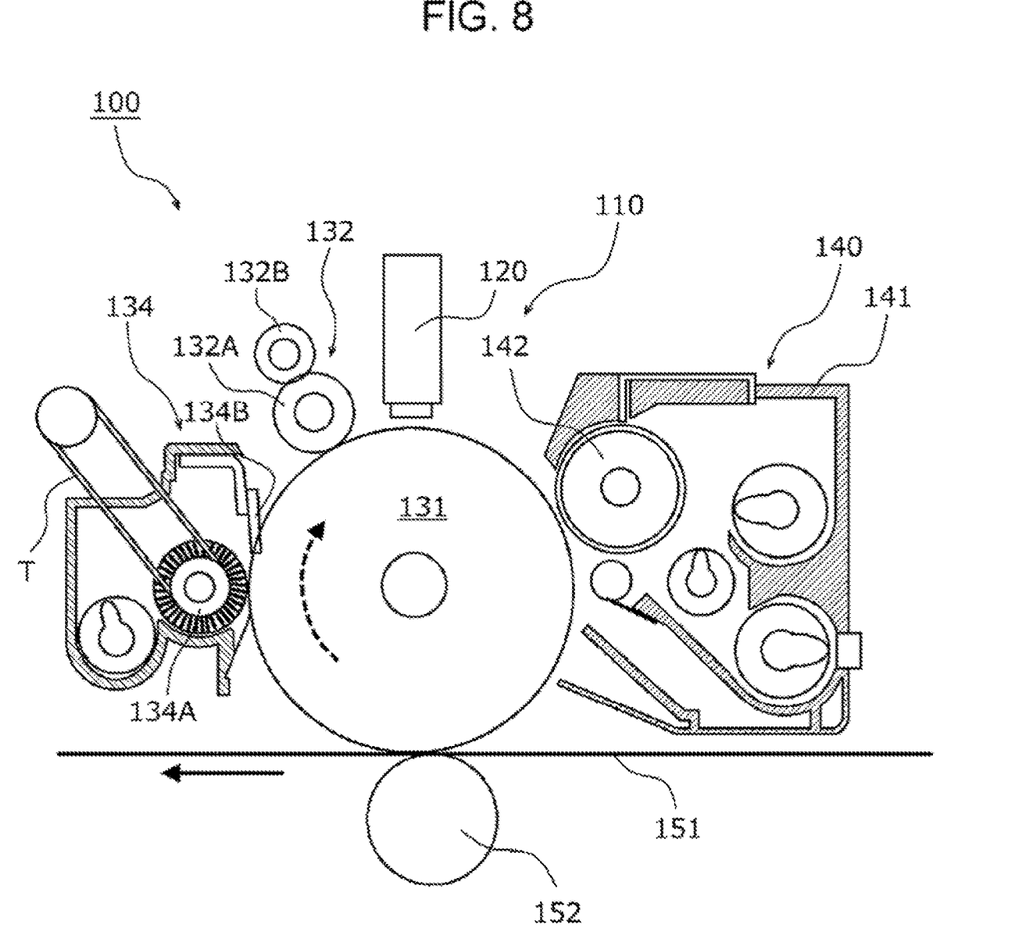
FIG. 8 is a schematic sectional view showing the relevant part of an image forming section of an image forming apparatus to which the rotary-body support structure according to this exemplary embodiment is applied.

FIG. 8 is a schematic sectional view showing the relevant part of an image forming section of an image forming apparatus 100 to which the rotary-body support structure 1 according to this exemplary embodiment is applied.

The image forming apparatus 100 includes an image forming section 110 that forms an image by using an electrophotographic system. The image forming section 110 includes exposure devices 120, photoconductor units 130, developing devices 140, a transfer device 150, a sheet transport device (not shown), and a fixing device (not shown) and forms a toner image on a sheet fed from a paper feed device (not shown). FIG. 8 shows one set of the photoconductor unit 130 and the developing device 140 of those provided for the respective colors, including yellow (Y), magenta (M), cyan (C), and black (K).

The photoconductor unit 130 includes a rotationally driven photoconductor drum 131. A charger 132, the exposure device 120, the developing device 140, a first transfer roller 152, and a cleaning device 134 are disposed along the rotation direction of the photoconductor drum 131.

The developing device 140 includes a developer housing 141 that accommodates developer. The developer housing 141 also accommodates a developer roller 142 disposed so as to oppose the photoconductor drum 131. The developing devices 140 have substantially the same configuration except for the developer accommodated in the developer housing 141 and form yellow (Y), magenta (M), cyan (C), and black (K) toner images.

The surface of the rotating photoconductor drum 131 is charged by the charger 132, and an electrostatic latent image is formed by latent-image forming light emitted from the exposure device 120. The electrostatic latent image formed on the photoconductor drum 131 is developed as a toner image by the developer roller 142.

The transfer device 15 includes an intermediate transfer belt 151 to which color toner images formed on the photoconductor drums 131 are to be transferred in a superimposed manner, first transfer rollers 152 that sequentially transfer (first-transfer) the color toner images formed on the photoconductor units 130 to the intermediate transfer belt 151, and second transfer rollers 153 (not shown) that transfer (second-transfer) the superimposed toner image formed on the intermediate transfer belt 151 to a sheet.

The toner images formed on the photoconductor drums 131 in the photoconductor units 130 are electrostatically transferred (first-transferred) to the intermediate transfer belt 151 by the first transfer rollers 152 supplied with a predetermined first transfer voltage at first transfer portions where the intermediate transfer belt 151 and the photoconductor drums 131 are in contact with each other. Thus, a superimposed toner image, in which color toner images are superimposed on one another, is formed.

The superimposed toner image on the intermediate transfer belt 151 is transported to a second transfer portion TR, where the second transfer rollers 153 are pressed against each other with the intermediate transfer belt 151 therebetween, as the intermediate transfer belt 151 moves.

When the superimposed toner image is transported to the second transfer portion TR, a sheet is fed from the paper feed device to the second transfer portion TR in accordance with that timing, and the superimposed toner image on the intermediate transfer belt 151 is transferred to the sheet.

The residual toner on the surface of the photoconductor drum 131 is removed by the cleaning device 134, and the surface of the photoconductor drum 131 is charged again by the charger 132.

The sheet to which the toner image has been transferred is transported, with the toner image being unfixed, to the fixing device via the sheet transport device. The sheet transported to the fixing device is heated and pressed to fix the toner image.

Example 1

Figure 9:
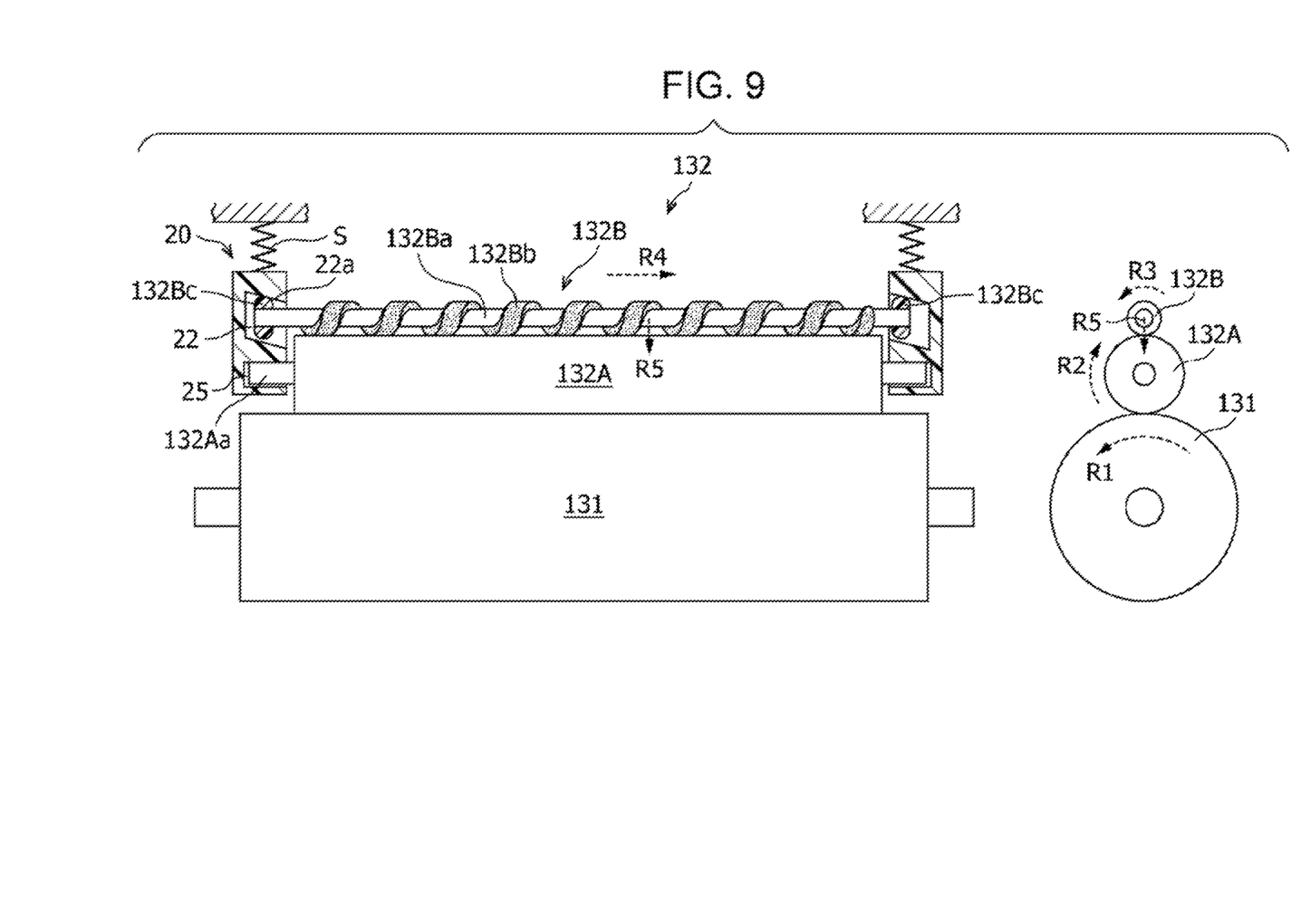
FIG. 9 is a schematic sectional view of a charger of a photoconductor unit, the charger having the rotary-body support structure according to this exemplary embodiment.

FIG. 9 is a schematic sectional view of the charger 132 of the photoconductor unit 130, the charger 132 having the rotary-body support structure 1 according to this exemplary embodiment.

The charger 132 of the image forming apparatus 100 includes a charging roller 132A, serving as an example of a contact body, that is in contact with and charges the photoconductor drum 131 while rotating, and a cleaning roller 132B, serving as an example of a rotary body, that is in contact with and is rotated in a driven manner by the charging roller 132A to clean the charging roller 132A.

As shown in FIG. 8, the cleaning roller 132B includes a strip-like contact portion 132Bb, which is a strip of foam sponge spirally wound around and fixed to the rotary shaft 132Ba. Ring bodies 132Bc, which are made of synthetic resin, such as POM, and serve as an example of a contact member, are press-fitted on the ends of the rotary shaft 132Ba.

The charging roller 132A and the cleaning roller 132B are rotatably supported by the holder members 20.

The holder members 20 have bearing portions 22 that come into contact with and support the ring bodies 132Bc fitted on the rotary shaft 132Ba of the cleaning roller 132B, and second bearing portions 25 that support a rotary shaft 132Aa of the charging roller 132A. The bearing portions 22 are recessed so as to receive the ring bodies 132Bc and have inclined portions 22a that come into contact with and support the ring bodies 132Bc.

The cleaning roller 132B and the charging roller 132A rotatably supported by the holder members 20 are configured such that the holder members 20 are urged by urging members (springs) S while the contact portion 132Bb is in contact with the charging roller 132A with a predetermined amount of engagement, and the charging roller 132A is in contact with the photoconductor drum 131.

When the photoconductor drum 131 is rotationally driven in the direction of arrow R1 in FIG. 9 while the charging roller 132A is in contact with the photoconductor drum 131, the charging roller 132A in contact with the photoconductor drum 131 is rotated in a driven manner in the direction of arrow R2 in FIG. 9, and the cleaning roller 132B in contact with the charging roller 132A with a predetermined amount of engagement is rotated in a driven manner in the direction of arrow R3 in FIG. 9.

Because the contact portion 132Bb is spirally wound with certain spaces between the turns in the cleaning roller 132B, thrust is generated in the axial direction of the rotary shaft 132Ba as the cleaning roller 132B rotates, moving the cleaning roller 132B by the thrust in the direction of arrow R4 in FIG. 9, relative to the charging roller 132A.

When the cleaning roller 132B moves by the thrust, the contact members 132Bc also move in the axial direction within the bearing portions 22, and the cleaning roller 132B moves in the direction intersecting (perpendicular to) the axial direction, as indicated by arrow R5 in FIG. 9, in accordance with the inclination of the inclined portions 22a of the bearing portions 22.

As a result, the amount of engagement of the contact portion 132Bb of the cleaning roller 132B with the charging roller 132A becomes larger than that before rotation, and the increased amount of engagement is maintained while the photoconductor drum 131 is rotationally driven.

When the rotation of the photoconductor drum 131 is stopped, the rotation of the cleaning roller 132B also stops, and the thrust acting on the cleaning roller 132B is eliminated. As a result, the cleaning roller 132B moves in the axial direction along the inclined portions 22a of the bearing portions 22 due to the resilience of the contact portion 132Bb, and the amount of engagement is reduced.

With this configuration, it is possible to maintain the reduced amount of engagement of the cleaning roller 132B with the charging roller 132A when the rotation of the cleaning roller 132B is stopped and thus to suppress the strain of the cleaning roller 132B due to contact with the charging roller 132A. In particular, storage strain of the cleaning roller 132B when the photoconductor unit 130 is not used is suppressed.

Example 2

Figure 10:
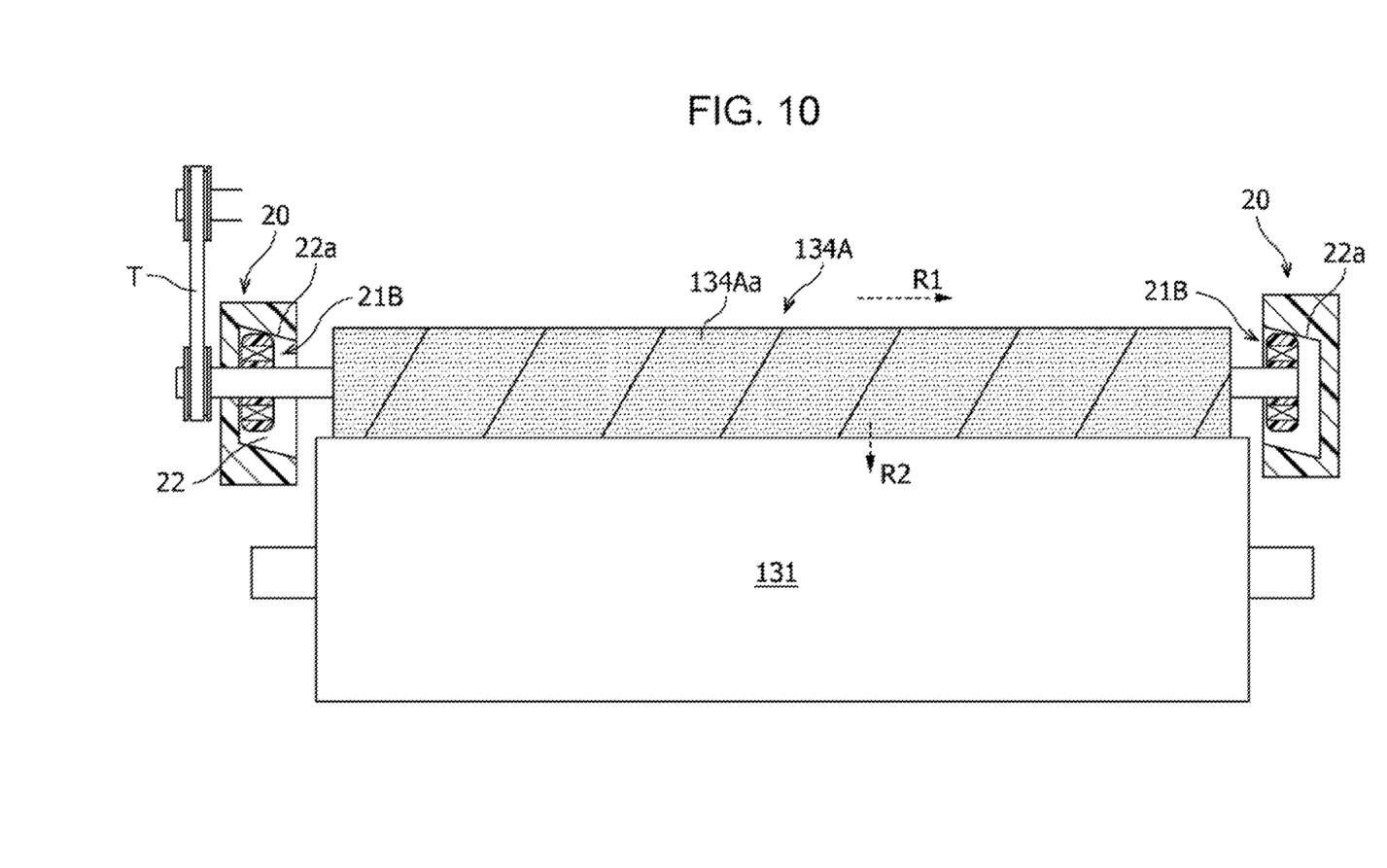
FIG. 10 is a schematic sectional view of a cleaning device of a photoconductor unit, the cleaning device having the rotary-body support structure according to this exemplary embodiment.
Figure 11:
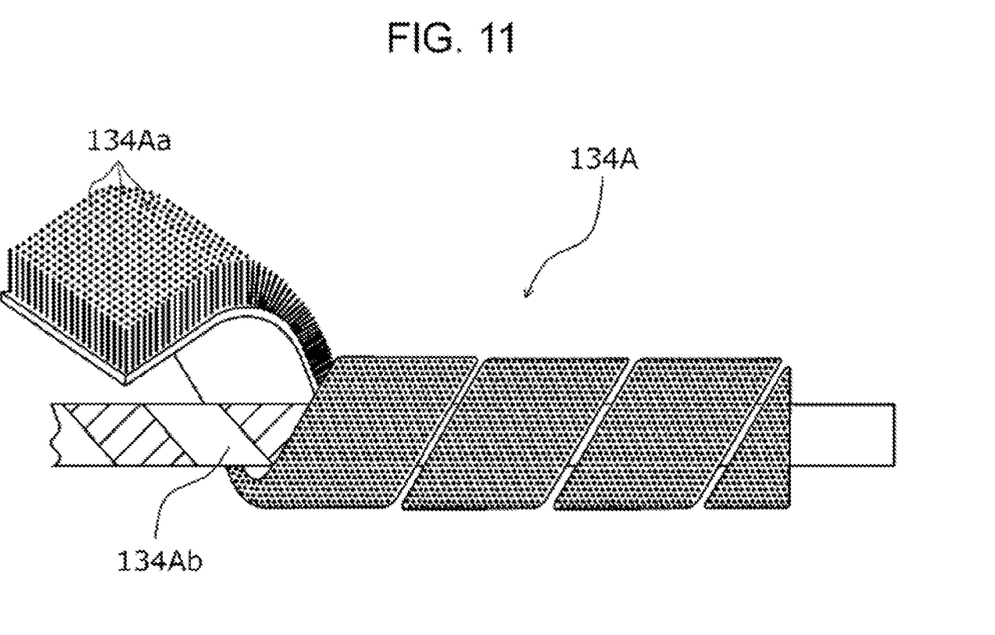
FIG. 11 illustrates a cleaning brush.

FIG. 10 is a schematic sectional view of a cleaning device 134 of the photoconductor unit 130, the cleaning device 134 having the rotary-body support structure 1 according to this exemplary embodiment, and FIG. 11 illustrates a cleaning brush 134A.

The cleaning device 134 of the image forming apparatus 100 includes the cleaning brush 134A and a cleaning blade 134B, serving as an example of the rotary body and disposed so as to be in contact with the surface of the photoconductor drum 131. The cleaning device 134 removes the residual toner on the surface of the photoconductor drum 131 and collects the residual toner in a waste toner container (not shown).

As shown in FIG. 11, the cleaning brush 134A includes: a base cloth; bristles 134Aa, serving as an example of a contact portion, which are raised pile on the base cloth; and a metal shaft 134Ab, serving as an example of the rotary shaft. A strip of bristles 134Aa is spirally wound around the shaft 134Ab to form a roller. Ball bearings 21B, serving as an example of the contact member, are fitted on the ends of the shaft 134Ab. The contact members may be made of a synthetic resin and may have a ring shape with a circular outer circumference or a tapered shape with an outer circumference tapered in the axial direction of the shaft 134Ab. However, from the standpoint of maintaining smooth rotation of the cleaning brush 134A, the ball bearings 21B are preferable.

The cleaning brush 134A is rotatably supported by the holder members 20. The holder members 20 have the bearing portions 22 that come into contact with and support the ball bearings 21B fitted on the shaft 134Ab of the cleaning brush 134A. The bearing portions 22 are recessed so as to receive the ball bearings 21B and have inclined portions 22a that come into contact with and support the ball bearings 21B.

The cleaning brush 134A rotatably supported by the holder members 20 is rotationally driven by a driving source (not shown) through a belt T in a state in which the bristles 134Aa are in contact with the photoconductor drum 131 with a predetermined amount of engagement. The belt T is flexible and can transmit rotation even when the cleaning brush 134A moves toward one side in the axial direction.

Because a strip of bristles 134Aa is spirally wound in the cleaning brush 134A, when the cleaning brush 134A in contact with the photoconductor drum 131 is rotationally driven, thrust is generated in the axial direction of the shaft 134Ab, moving the cleaning brush 134A in the direction of arrow R1 in FIG. 10 relative to the photoconductor drum 131.

When the cleaning brush 134A moves by the thrust, the ball bearings 21B also move in the axial direction within the bearing portions 22, and the cleaning brush 134A moves in the direction intersecting (perpendicular to) the axial direction, as indicated by arrow R2 in FIG. 10, in accordance with the inclination of the inclined portions 22a of the bearing portions 22.

As a result, the amount of engagement of the bristles 134Aa of the cleaning brush 134A with the photoconductor drum 131 becomes larger than that before rotation, and the increased amount of engagement is maintained while the cleaning brush 134A is rotationally driven.

When the rotation of the cleaning brush 134A is stopped, the thrust acting on the cleaning brush 134A is eliminated, and the cleaning brush 134A moves in the axial direction along the inclined portions 22a of the bearing portions 22 due to the resilience of the bristles 134Aa. Thus, the amount of engagement is reduced.

With this configuration, it is possible to maintain the reduced amount of engagement of the cleaning brush 134A with the photoconductor drum 131 when the rotation of the cleaning brush 134A is stopped, and thus, to suppress flattening of bristles due to engagement of the cleaning roller 132B in the photoconductor drum 131. As described above, by making the cleaning brush 134A engage with the photoconductor drum 131 when the cleaning brush 134A is rotationally driven and by reducing the amount of engagement when rotation thereof is stopped, it is possible to achieve high cleaning performance while suppressing flattening of the bristles 134Aa.

Example 3

Figure 12:
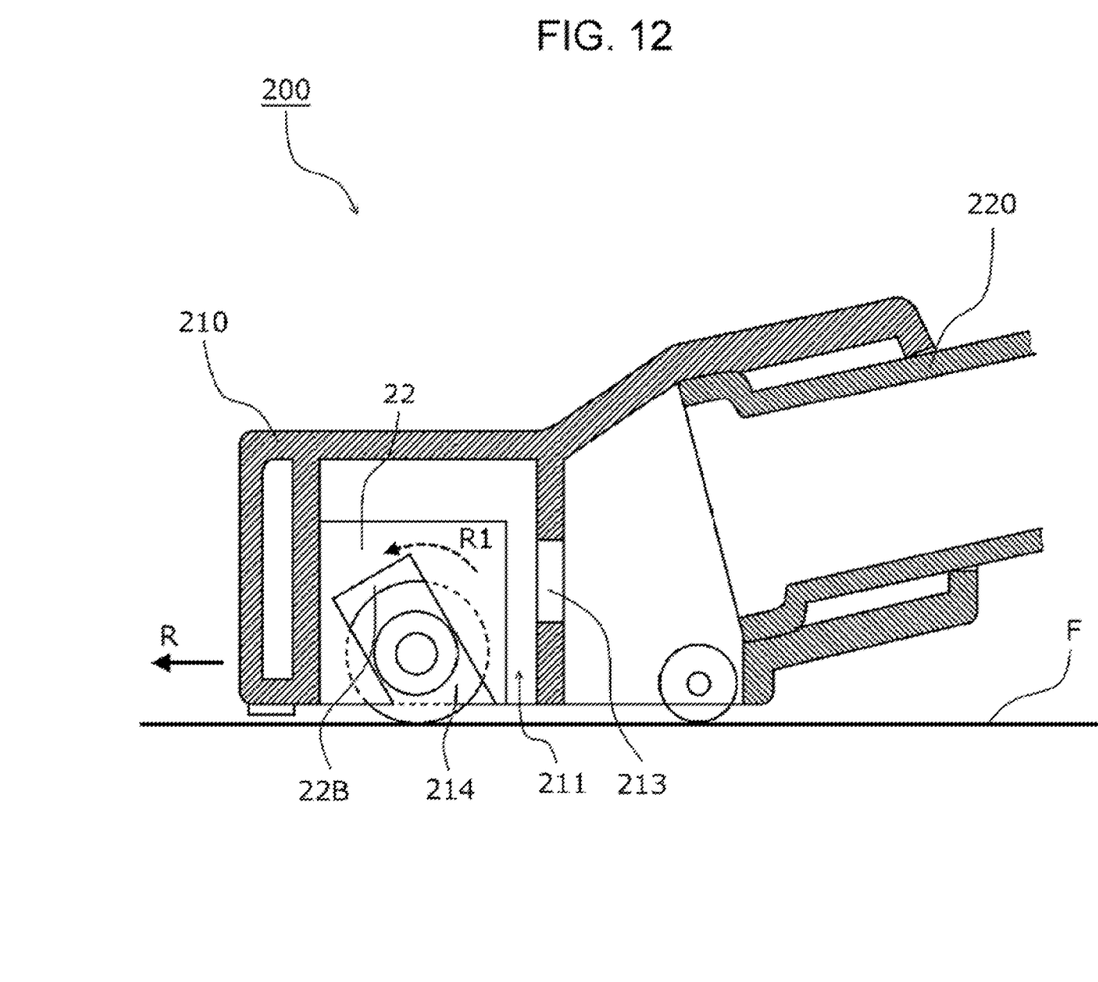
FIG. 12 is a vertical schematic sectional view of a head of an electric vacuum cleaner, the head having the rotary-body support structure according to this exemplary embodiment.
Figure 13:
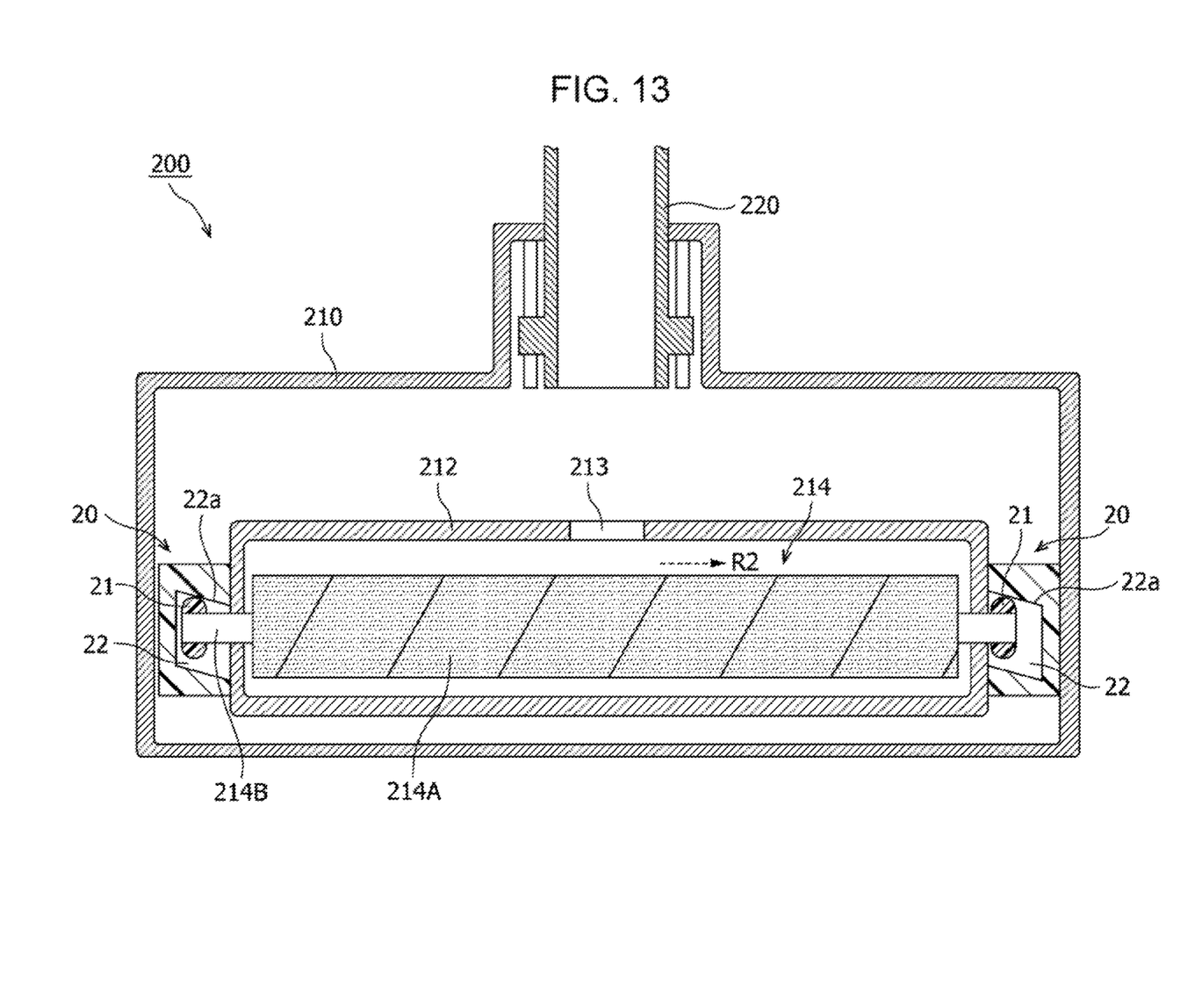
FIG. 13 is a horizontal schematic sectional view of the head of the electric vacuum cleaner, the head having the rotary-body support structure according to this exemplary embodiment.

FIG. 12 is a vertical schematic sectional view of a head of an electric vacuum cleaner, the head having the rotary-body support structure 1 according to this exemplary embodiment, and FIG. 13 is a horizontal schematic sectional view of the head of the electric vacuum cleaner, the head having the rotary-body support structure 1 according to this exemplary embodiment.

As shown in FIGS. 12 and 13, a head 200 of an electric vacuum cleaner for vacuuming dust and the like on a floor F includes a case 210 having a substantially T shape in plan view. One end of a connecting pipe 220 is connected to the trailing end of the case 210 so as to be able to swivel relative to the case 210, and the other end of the connecting pipe 220 is connected to a body (not shown) of the electric vacuum cleaner. The case 210 has, in the bottom thereof, near the front end, a penetrating rectangular suction port 211 extending in the left-right direction.

A rectangular frame-like partition plate 212 is provided so as to stand upright on the inner bottom surface of the case 210 and so as to surround the suction port 211, and a penetrating air suction port 213 is provided at the center of the rear wall of the partition plate 212.

The holder members 20 are provided on the left and right walls of the partition plate 212, and the holder members 20 rotatably support a rotary brush 214, serving as an example of the rotary body. The rotary brush 214 does not have a driving source, such as a motor, and is rotated by negative pressure produced when air is sucked from the air suction port 213.

The rotary brush 214 includes bristles 214A, serving as an example of the contact portion, and a rotary shaft 214B. A strip of bristles 214A is spirally wound around the rotary shaft 214B to form a roller. The contact members 21 are press-fitted on the ends of the rotary shaft 214B.

The contact members 21 may be made of synthetic resin and have a tapered shape with an outer circumference tapered in the axial direction of the shaft 134Ab. Alternatively, from the standpoint of smoothly rotating the rotary brush 214 with negative pressure produced by air suction, the contact members 21 may be ball bearings.

The holder members 20 have the bearing portions 22 that come into contact with and support the contact members 21 fitted on the rotary shaft 214B of the rotary brush 214. As shown in FIG. 12, the bearing portions 22 have grooves 22B in which the rotary brush 214 can move in a direction away from the floor F (indicated by arrow R in FIG. 12) and which extend at an angle with respect to the direction in which the head of the electric vacuum cleaner advances.

The bearing portions 22 are recessed so as to receive the contact members 21 in plan view and have inclined portions 22a that come into contact with and support the contact members 21.

In the thus-configured head of the electric vacuum cleaner, when air is sucked while the rotary brush 214 is in contact with the floor F, the rotary brush 214 rotates in the direction of arrow R1 in FIG. 12. When the air suction power is increased, the rotary brush 214 rotates at higher speed. Because a strip of the bristles 214A is spirally wound in the rotary brush 214, thrust is generated in the axial direction of the rotary shaft 214B due to the rotation, moving the rotary brush 214 in the direction of arrow R2 in FIG. 13, relative to the floor F.

When the rotary brush 214 moves by the thrust, the contact members 21 also move in the axial direction within the bearing portions 22, and the rotary brush 214 moves along the grooves 22B, in the direction intersecting (perpendicular to) the axial direction, in accordance with the inclination of the inclined portions 22a of the bearing portions 22.

As a result, the amount of engagement of the bristles 214A of the rotary brush 214 with the floor F increases, improving the cleaning performance. When a large load is applied to the rotary brush 214 by rotating the rotary brush 214, as in the case where the floor F is a carpet, because the bearing portions 22 have the grooves 22B in which the rotary brush 214 can move in the direction away from the floor F, the amount of engagement of the rotary brush 214 with the floor F is reduced, and thus, the load on the motor for generating an air-suction force of the electric vacuum cleaner is reduced.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A rotary-body support structure comprising:
   a rotary body including a rotary shaft and a flexible contact portion spirally wound around the rotary shaft; and
   bearing parts that rotatably support the rotary body,
   wherein the amount of engagement of the rotary body with a contact body that is in contact with the contact portion of the rotary body changes when the rotary body moves toward one side in a rotation axis direction.

2. The rotary-body support structure according to claim 1, wherein
   the bearing parts include contact members having a larger diameter than the rotary shaft and fitted on the rotary shaft of the rotary body, and inclined portions that are in contact with and support the contact members, and
   the contact members are supported so as to be movable in a direction intersecting the rotation axis direction when the rotary body moves in the rotation axis direction.

3. The rotary-body support structure according to claim 2, wherein the contact members have a ring shape with a circular outer circumference.

4. The rotary-body support structure according to claim 2, wherein the contact members have a tapered shape with an outer circumference tapered in the rotation axis direction.

5. The rotary-body support structure according to claim 2, wherein the contact members are ball bearings including outer races in contact with the inclined portions and inner races attached to the rotary shaft.

6. The rotary-body support structure according to claim 2, wherein the contact member is fitted on one end of the rotary shaft.

7. The rotary-body support structure according to claim 3, wherein the contact member is fitted on one end of the rotary shaft.

8. The rotary-body support structure according to claim 4, wherein the contact member is fitted on one end of the rotary shaft.

9. The rotary-body support structure according to claim 5, wherein the contact member is fitted on one end of the rotary shaft.

10. The rotary-body support structure according to claim 6, wherein the inclined portion is formed on one side corresponding to the one end of the rotary shaft and is in contact with the rotary shaft, and the contact member having a tapered shape with an outer circumference tapered in the rotation axis direction is fitted on the other end of the rotary shaft.

11. The rotary-body support structure according to claim 7, wherein the inclined portion is formed on one side corresponding to the one end of the rotary shaft and is in contact with the rotary shaft, and the contact member having a tapered shape with an outer circumference tapered in the rotation axis direction is fitted on the other end of the rotary shaft.

12. The rotary-body support structure according to claim 8, wherein the inclined portion is formed on one side corresponding to the one end of the rotary shaft and is in contact with the rotary shaft, and the contact member having a tapered shape with an outer circumference tapered in the rotation axis direction is fitted on the other end of the rotary shaft.

13. The rotary-body support structure according to claim 9, wherein the inclined portion is formed on one side corresponding to the one end of the rotary shaft and is in contact with the rotary shaft, and the contact member having a tapered shape with an outer circumference tapered in the rotation axis direction is fitted on the other end of the rotary shaft.

14. The rotary-body support structure according to claim 1, wherein
   the contact body is a charging roller that is in contact with and charges a photoconductor drum while rotating, and
   the rotary body is a cleaning roller having the contact portion made of an elastic member spirally wound around the outer circumference of the rotary shaft, the cleaning roller being in contact with the charging roller and cleaning the surface of the charging roller while rotating.

15. The rotary-body support structure according to claim 2, wherein
   the contact body is a charging roller that is in contact with and charges a photoconductor drum while rotating, and
   the rotary body is a cleaning roller having the contact portion made of an elastic member spirally wound around the outer circumference of the rotary shaft, the cleaning roller being in contact with the charging roller and cleaning the surface of the charging roller while rotating.

16. The rotary-body support structure according to claim 1, wherein
   the contact body is a photoconductor drum, and
   the rotary body is a cleaning brush including the contact portion having a brush spirally wound around the outer circumference of the rotary shaft, the cleaning brush being in contact with the photoconductor drum and cleaning the surface of the photoconductor drum while rotating.

17. The rotary-body support structure according to claim 2, wherein
   the contact body is a photoconductor drum, and
   the rotary body is a cleaning brush including the contact portion having a brush spirally wound around the outer circumference of the rotary shaft, the cleaning brush being in contact with the photoconductor drum and cleaning the surface of the photoconductor drum while rotating.

18. The rotary-body support structure according to claim 16, wherein the cleaning brush is rotationally driven via a belt.

19. The rotary-body support structure according to claim 1, wherein
   the contact body is a floor, and
   the rotary body is a vacuum-cleaner brush including the contact portion having a brush spirally wound around the outer circumference of the rotary shaft, the vacuum-cleaner brush being in contact with and cleaning the floor while being rotated by air suction.

20. The rotary-body support structure according to claim 2, wherein
   the contact body is a floor, and
   the rotary body is a vacuum-cleaner brush including the contact portion having a brush spirally wound around the outer circumference of the rotary shaft, the vacuum-cleaner brush being in contact with and cleaning the floor while being rotated by air suction.

* * * * *